United States Patent [19]

Ferrentino

[11] 4,080,107
[45] Mar. 21, 1978

[54] BELLOWS PUMP AND PUMPING PLANT FOR OIL-FILLED ELECTRIC CABLES

[75] Inventor: Antonio Ferrentino, Monza (Milan), Italy

[73] Assignee: Industrie Pirelli Societa per Azioni, Milan, Italy

[21] Appl. No.: 714,194

[22] Filed: Aug. 13, 1976

[30] Foreign Application Priority Data

Sep. 8, 1975 Italy .................. 26985 A/75

[51] Int. Cl.² .................. F04B 9/08; F04B 23/04; F16J 3/06; F16K 31/02
[52] U.S. Cl. .................. 417/53; 417/273; 417/388; 417/446; 92/44; 251/139; 137/533.31
[58] Field of Search ............ 417/472, 473, 385, 388, 417/387, 446, 53, 199 A, 297, 505, 394, 53, 383, 273; 137/533.31, 542, 533.17; 251/359, 130, 138, 139; 92/34, 35, 44

[56] References Cited

U.S. PATENT DOCUMENTS

| 1,915,833 | 6/1933 | Mantle | 417/384 |
| 2,001,764 | 5/1935 | Bradley | 137/533.17 |
| 2,506,235 | 5/1950 | Nicolls | 417/388 |
| 2,545,315 | 3/1951 | Sproull | 417/273 |
| 2,616,955 | 11/1952 | Dube et al. | 251/139 |
| 2,648,291 | 8/1953 | Moller | 417/446 |
| 2,843,044 | 7/1958 | Mashinter | 417/388 |
| 2,843,045 | 7/1958 | Mashinter | 417/472 |
| 3,018,797 | 1/1962 | Parks | 251/362 |
| 3,153,381 | 10/1964 | Holley | 417/388 |
| 3,170,598 | 2/1965 | McPherson | 417/472 |
| 3,464,668 | 9/1969 | Jacob | 251/139 |
| 3,744,380 | 7/1973 | Steiger | 417/273 |
| 3,945,396 | 3/1976 | Hengesbach | 137/542 |

FOREIGN PATENT DOCUMENTS

| 939,227 | 11/1948 | France | 417/273 |
| 1,072,428 | 12/1959 | Germany | 251/139 |

Primary Examiner—Carlton R. Croyle
Assistant Examiner—Thomas I. Ross
Attorney, Agent, or Firm—Brooks, Haidt, Haffner & Delahunty

[57] ABSTRACT

A pump for pumping insulating oil for oil-filled electric cables in which a driven piston is within and spaced from a tubular bellows which is surrounded by an enclosure. The bellows forms a chamber with the enclosure which contains the cable oil, and the bellows prevents contact of the mechanical parts of the pump, other than an intake valve and a delivery valve, with the cable oil. Preferably, the space between the piston and the bellows is filled with oil to transmit motion of the piston to the bellows. The delivery valve is urged closed by a spring, and the intake valve has an element made of lightweight materials and is held closed by gravity and the cable oil pressure but opens by reason of cable oil pressure reduction and the static pressure of the cable oil fed to the intake valve. Also, a plurality of such pumps operable by a single drive mechanism and a method for evacuating gas from the pump and pump lines in which the delivery valve is operated by a magnetic field external to the valve.

19 Claims, 6 Drawing Figures

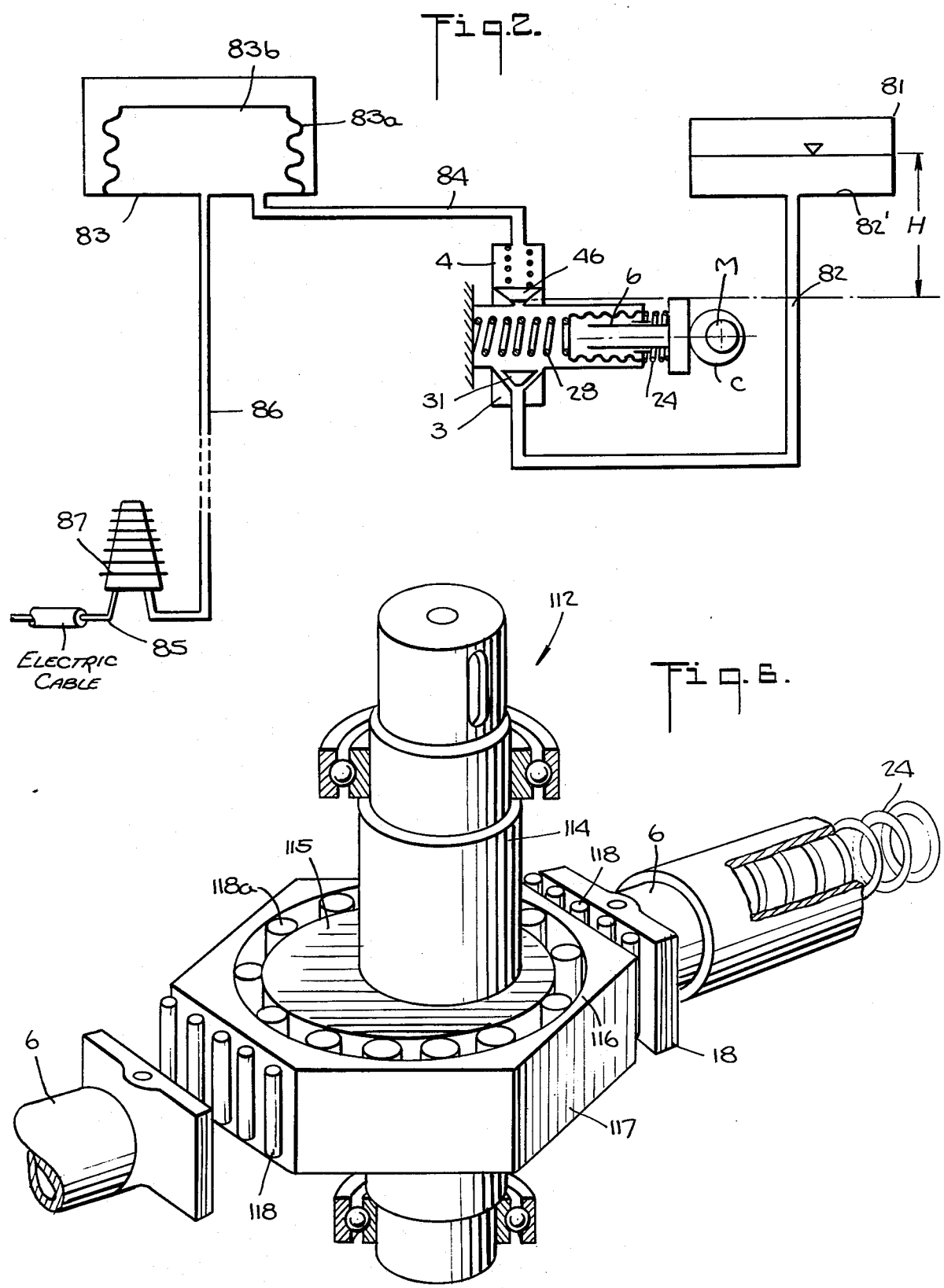

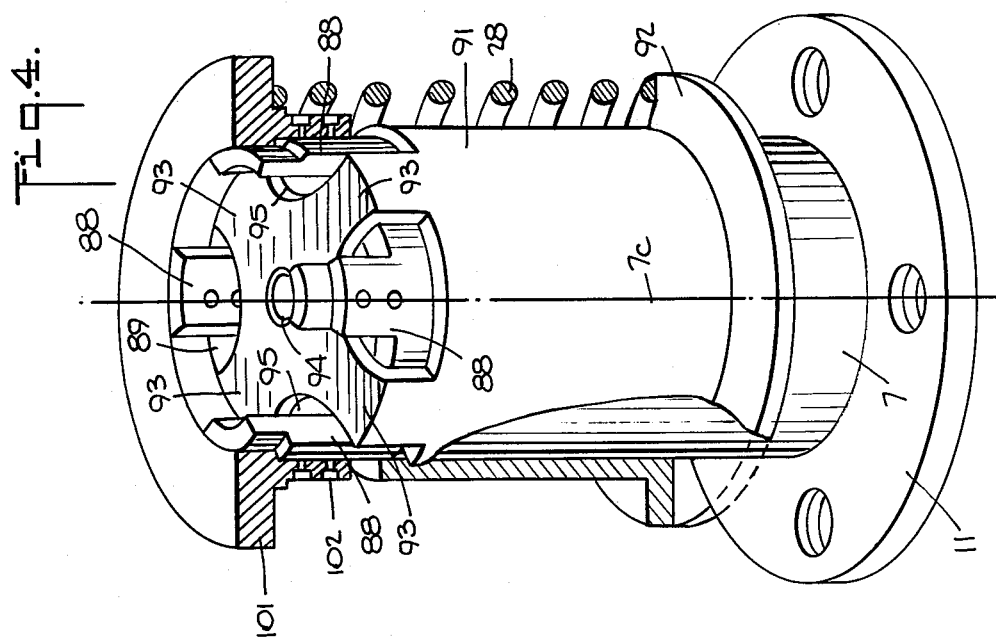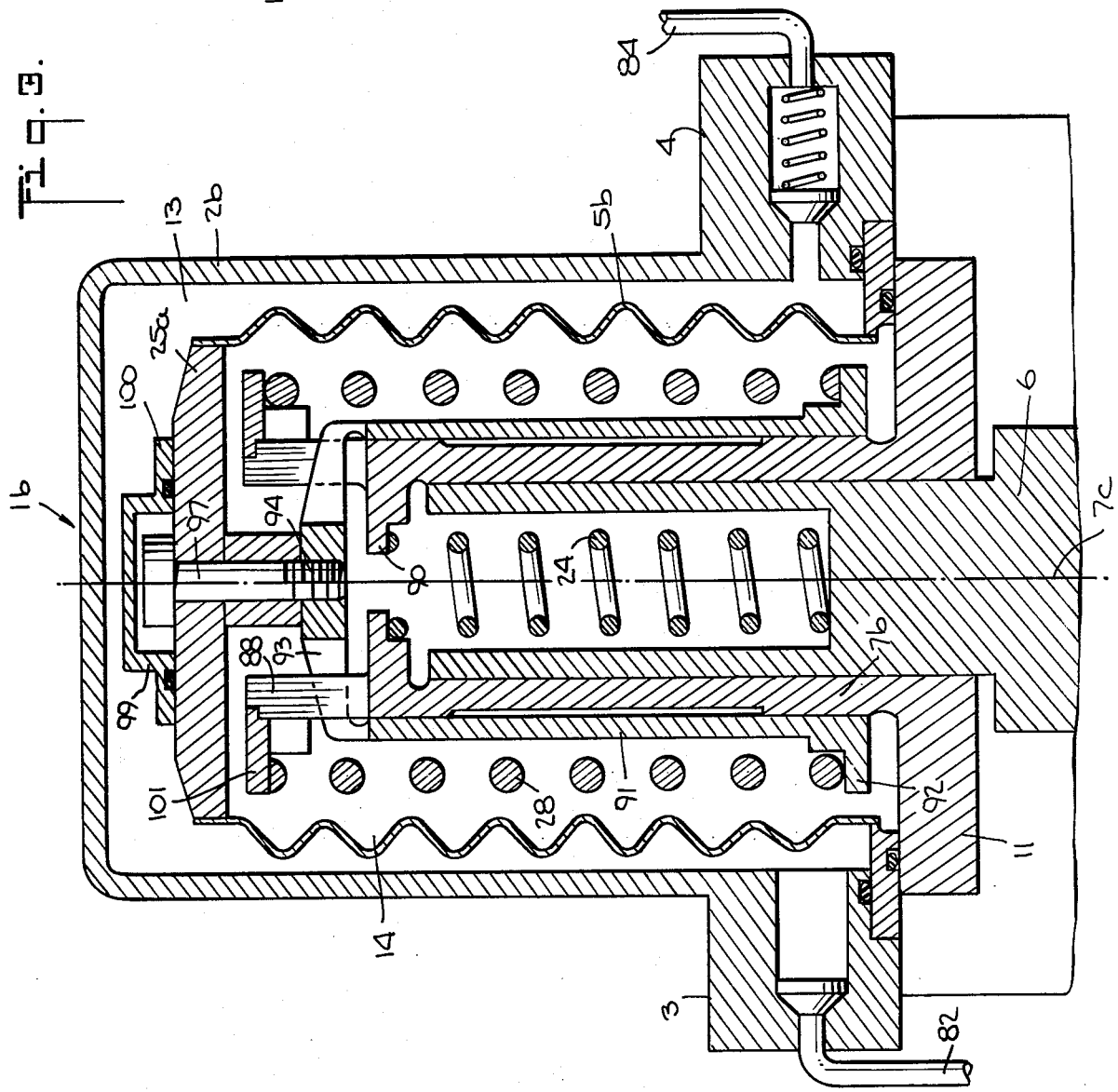

BELLOWS PUMP AND PUMPING PLANT FOR OIL-FILLED ELECTRIC CABLES

The present invention relates to improvements in pumping plants for oil-filled electric cables and to improvements in the positive-displacement pumps used in said plants. As is known, oil-filled electric cables are associated with pumping plants, such plants being intended, for example, to displace the fluid oil in the cable to remove heat and to avoid the formation of zones of localized overheating at the joints or, also by way of example, to balance the fluid oil volume variations due to changes in the temperature of the cables.

In the plants employed for such purposes, and also, in general, for all various uses which require positive-displacement or rotary pumps, a serious disadvantage is the fluid oil contamination which has been encountered. This contamination is due to impurities unavoidably present in the gears of the rotary pumps or to those originating in the positive-displacement pumps from the continuous rubbing of the piston in its associated cylinder. Unfortunately, said impurities are extremely prejudicial to the cable life, since they cause a worsening of the dielectric characteristics required for the fluid oil and compromise, very often in an impermissible manner, the electric insulation of the cable.

To overcome these drawbacks, resort has been had to pumps having a circuit in which the fluid oil might circulate without coming into contact with impurities caused by mechanical parts. To this end, positive-displacement pumps already existing were experimented with, such pumps comprising substantially an envelope containing a bellows so arranged that the outer walls of the bellows and the inner walls of the envelope form a chamber communicating to the outside only through a suction valve and a compression valve. The pump further comprises a cylinder with its associated piston, an actuation fluid inside the bellows and an actuation mechanism for causing movement of the piston.

In said pumps, the actuation mechanism acts on the piston, moving it in the cylinder either in one sense, or in the opposite sense, so as to exert cyclically a thrust on the actuation fluid existing inside the bellows. Said thrust is transmitted from the actuation fluid to the bellows, causing the expansion of the relative undulations in the wall of the bellows without any rubbing on the inner walls of the envelope. When the piston stops its thrust action on the actuation fluid, the bellows returns to its original position either in conquence of its own elasticity, or by virtue of an appropriate, previously compressed spring.

During the cyclic deformation of the bellows in one sense and in the opposite sense, the inner volume of said chamber increases and decreases progressively, so that a fluid, for example, fluid oil, can be sucked into the chamber and then delivered externally to the pump at the desired pressure.

It will be apparent that the above-described pump may solve the hereinbefore-mentioned drawback occurring in the past, because the impurities caused by the rubbing of the piston in the associated cylinder would remain inside the bellows, without any possibility of entering into and migrating in the fluid oil circuit arranged externally to the bellows. Unfortunately, pumps of this type also involve further disadvantages which make them unsuitable to be used in pumping plants for oil-filled electric cables.

In particular, the valves of the previously known bellows-type, positive-displacement pumps work in an unreliable and unsatisfactory manner. In fact, the conventional electrically operable, or electrovalves, in addition to being of high cost, involve the further drawback that the pump operation may stop in consequence of a failure of an electric part, for example, the rupture of a feeding wire of the energizing coil. It can be easily understood that such a failure, even though infrequent, might actually cause a serious inconvenience, since the pump would not act, at the desired moment, to suck or to deliver fluid oil under pressure.

Also, it has been found that all the valves heretofore used do not ensure a consistent movement between the fixed parts and the moving parts, when several openings and closing operations are to be carried out for the purpose of sucking or delivering fluid oil under pressure. Moreover, the valves used at present have a considerable inertia, and this causes the drawback of delayed actions of the pump, or at least, working irregularities.

Therefore, it is clear that the valves of the present bellows-type pumps are unsuitable to be used in pumping plants for electric cables often situated in remote zones, where it is difficult to carry out frequent maintenance and where, for the lack of operators, an automatic operation of full reliability is necessary. In addition, it has been found that the present bellows-type pumps have a high cost and relatively large overall dimensions for the limited spaces existing in proximity of the sealing ends of the cables, where the pumping plant is usually arranged.

Accordingly, the present invention has, as one object, the improvement of the present bellows-type pumps in order to enable them to operate satisfactorily, and at a low installation cost, in the pumping plants for oil-filled electric cables.

In one embodiment of the present invention, a pump intended to suck fluid oil, which is under vacuum, for electric cables and to compress said oil to a pre-established pressure, comprises an envelope, a delivery valve and a suction valve associated with said envelope, and a bellows internal to the envelope, an inner chamber being created between the envelope and the bellows, said chamber communicating with the pump exterior when at least one of said valves is opened. Said bellows is alternatively expanded and compressed by means of an actuation fluid controlled by a piston slidable in a fluid cylinder and driven by an actuation mechanism. Said actuation fluid is within a closed space, limited by said bellows and said cylinder with its relative piston, and said suction and delivery valves comprise, respectively, a first and a second valve body with a first and a second frusto-conical seat converging, respectively, toward a first and a second central hole provided for the passage of the fluid oil, a first and a second operating element, each of said operating elements comprising at least a terminal part whose lateral outer surface has a shape corresponding to that of the seats of the valve body to cover said central hole, and a first and a second annular gasket being associated with and protruding from a suitable portion of each lateral surface of the operating elements, said gasket being made of an elastomer. Preferably, at least the first operating element of the suction valve is made of a material having a specific gravity less than 2.5 gr/cm$^3$, and said suction valve is so associated with the pump envelope that the first operating element remains inserted only by reason of its own weight in said first frusto-conical seat of the valve body without the presence of fluid oil in the said chamber when the pump is at a standstill, and said first operating element is pushed against said first seat by the pressure of the fluid oil inside said chamber during the pump compression phase. Said first element is displaced from said first seat by the combined action of the lowering of pressure in the pump chamber during the suction phase and of pre-established values of static pressure resulting from the level differences between the fluid oil under vacuum and said first operating element. Said second operating element of the delivery valve is pushed against said second seat by a pre-established force, and is displaced from said second seat during the pump compression phase by the action of the fluid oil pressure which is higher than said pre-established force.

The above-described pump is advantageously used in connection with oil-filled electric cables which require an immediate use of the pump at any moment and a reliable automatic working. The advantages are evident in the characteristics present in combination in the pump valves, namely:

(a) the provision of frusto-conical surfaces of the valve body and of the operating element and the coupling of said surfaces, with the interposition of an annular gasket of elastomeric material;

(b) an arrangement of the valves such that their relative operation depends only on the working cycles of the pump and on the static pressure of the fluid oil which is to be sucked from the pump outside towards its inside;

(c) the use of an operating element for the suction valve, carried out with a light material, whose specific gravity is less than 2.5 gr/cm$^3$.

By virtue of the first characteristic, an easy and reliable centering can be obtained between the valve body and the operating element and consequently, owing to the deformability of the gasket of elastomeric material, a perfect closure of the valves during the many working cycles of the pump is obtained.

In turn, the gasket of elastomeric material, which obviously has anti-contamination properties with respect to the fluid oil, does not affect the dielectric properties of the latter.

By virtue of the second characteristic, the valves are quite unable to cause failures because of conditions external to the pump and, as long as the pump works, they open and close in a reliable manner.

By virtue of the third characteristic, i.e., the use of the suction valve made of a material having a specific gravity less than 2.5 gr/cm$^3$, the operating element is light and, as the value of level difference of the fluid oil necessary to lift said element is consequently reduced, the whole pump, and the related circuit of fluid oil to be sucked, has reduced overall dimensions, so that there is a greater possibility to locate the pump in the small spaces existing in proximity of the sealing ends where said pumps are usually arranged.

It is moreover evident that, if said characteristics of the invention, which, considered singly, would not be sufficient to improve the bellows-type positive-displacement pumps already known, are considered in mutual combination, they ensure the possibility of enabling said pumps to work in association with electric cables, avoiding any presence of mechanical contaminants in the fluid oil.

On the other hand, it is clear that said result has been achieved at a reduced cost, since the construction of the valves is simple and the cost of installation of the pump is considerably cut owing to the limited overall dimensions due to a small level difference of the fluid oil.

In a preferred embodiment of the valves, each of said valve bodies comprises an outer and an inner surface which are both substantially cylindrical, and that said frusto-conical seat of the valve body is determined by the inner surface of an insert forced within said inner cylindrical surface of the valve body, the operating elements of the valve comprising, besides said terminal part having a frusto-conical lateral surface, a rod and spokes, said rod being connected at its first end to said terminal part, and at its second end to said spokes, which are arranged radially and in contact with the inner cylindrical surface of the valve body in such a way as to guide said operating element when it is displaced from said frusto-conical seat of the valve body.

The above-described preferred embodiment of the valve has allowed the achievement of satisfactory results. In fact, the construction of an operating element provided with spokes advantageously permits the carrying out of an easy checking of said element in its displacements inside the valve body during the cyclic and often numerous steps for opening and closing the valve.

The use of an insert manufactured separately and then forced into the valve body gives the possibility of making an easy and accurate processing of the frusto-conical seat of the valve and consequently ensures the possibility of a precise coupling with the related operating element.

In particular, and preferably, the cylindrical surfaces of the valve body are made of metal, for example, of stainless steel, the insert is made of polytetrafluoroethylene, the terminal part and the rod of the operating element are made of an aluminum alloy, and the spokes of the operating element are made of polytetrafluoroethylene. The provision and the combined use of different materials having particular characteristics, as indicated above, constitutes a further improvement of the bellows-type positive-displacement pumps.

In fact, as is known, polytetrafluoroethylene has relevant anti-adhesive properties with respect to all of the materials with which it may come into contact, and therefore, it does not give rise to any adhesion phenomenon between the seat of the valve body and the corresponding surface of the operating element, as well as between the inner surface of the valve and the guiding spokes.

Moreover, the operating element of the suction valve comprises parts made of aluminum and parts made of polytetrafluoroethylene, which have a low specific gravity so that, at equal dimensions with respect to other materials, like the conventionally used steel, it has advantageously a lower inertia to movement of the valve, and consequently, cooperates in providing a reliable action of the pump at the desired moment.

It is also evident that the use of the same materials for the suction valve and for the delivery valve affords the further advantage of an equal processing and construction of the main components of the valves, and therefore, in the practice, a better availability of spare parts.

A further object of the invention is a pump as described hereinbefore, characterized in that at least one of said valves comprises means able to move the operating element away from the seat of the valve body when the pump is not working, said means comprising a first and a second part, said first part being external to the valve and independent from mechanical connections with the latter, and the second part being internal to the valve body and being able to displace the operating element in consequence of a field of forces originated by said first part.

The above-described means permit opening of one of the valves when the pump is not working, namely, when the valves, the suction and compression phases being lacking, would remain in their closed positions. The opening of one of the valves when the pump is not working enables the suction of the air present inside the chamber when it is necessary to create hard vacuum in the plant comprising the pump, so that, during the succeeding operation of the pump, when the already degassified fluid oil is sucked inside the chamber, said oil is not contaminated by air particles. In this way it is possible to avoid completely any subsequent ionization phenomena when the fluid oil is admitted to the electric cable under voltage.

In the preferred embodiment, the pump is characterized by the fact that said valve operating means is able to produce a magnetic operating condition, said first part being able to create a field of magnetic forces, and said second part being movable in consequence of said field of magnetic forces. Such means is devoid of any mechanical connection passing between the interior and the exterior of the valve body, so that the possible causes of air infiltration, due to an insufficient sealing of the valve body with respect to the exterior of the pump, are advantageously eliminated.

In particular, and preferably, said valve operating means comprises a first part, constituted by a magnetic field generating device, and a second part, constituted by a sleeve of magnetic material, said sleeve and said device being separated by means of a valve body of non-magnetic material, said sleeve being displaceable inside the valve body when the magnetic field either by movement or generation thereof applies forces to the sleeve in the direction of the axis of the frusto-conical seat and in a direction opposite to the vertex of the cone, said sleeve being able to engage appropriate radial projections of said operating element to cause the detachment of the latter from the seat of the valve body.

A still further object of the invention is a pumping plant for oil-filled electric cables comprising at least a pump as described hereinbefore, and characterized by the fact of further comprising a first tank containing fluid oil under vacuum, a second tank, able to receive and to maintain fluid oil at the desired pressure, a first and a second piping to connect, respectively, said first tank with the suction valve and said second tank with the delivery valve of the pump, said first tank being situated at a pre-established height with respect to the operating element of the delivery valve in such a way that level differences between the fluid oil and said second operating element, with a minimum value of 40 cm., are able, during regular operation of the pump, to displace said first operating element from the seat of the suction valve body.

In its preferred embodiment, the plant is characterized by the fact that it comprises a plurality of pumps, a first and a second manifold, the axes of said pumps being situated horizontally in a same plane, the valves of said pumps having their axes perpendicular to said plane, said suction and delivery valves being hydraulically connected to each other through the first and the second manifold, respectively, said first manifold being connected to the first piping connected to the first tank, said second manifold being connected to the second piping connected to the second tank.

Preferably, said plurality of pumps is so arranged that the respective axes of the pumps are directed radially, and the pistons of the pumps are pushed by appropriate springs towards a single actuation mechanism.

The plant of the invention is particularly intended to supply a tank intended to contain fluid oil for electric cables, in particular, for example, a pressurization tank connected with pipes to the oil ducts of the cable or cables.

The advantage of the plant lies in the feature of having a plurality of pumps, all working together, with only one level difference of fluid oil, which may have a reduced value with respect to the operating elements of the suction valves. Said feature permits the joining of the plant parts at a single main station which, having reduced dimensions, requires only a low installation cost.

A still further object of the invention is a method for actuating a pumping plant as described hereinbefore, characterized in that it comprises the steps of:

(a) exerting, with a force field external to one of the valves to which the operating element of the valve is responsive, an action intended to lift said operating element from the frusto-conical seat of the valve body;

(b) discharging from points on the first and on the second piping the air present in the first and in the second tank and in the first and second piping;

(c) discontinuing the force field applied in phase (a) to close the valve;

(d) admitting fluid oil for electric cables into the first tank;

(e) actuating the pump to send the fluid oil at the desired pressure from the first tank to the second tank.

Preferably, said method is characterized in that the force field external to the pump is a magnetic force field.

Other objects and advantages of the present invention will be apparent to those skilled in the art from the following description of presently preferred embodiments thereof, which description should be considered in conjunction with the accompanying drawings in which:

FIG. 2 is a schematic diagram of a pumping plant comprising the pump shown in FIG. 1;

FIG. 3 is a side elevation, sectional view of an alternative embodiment of the pump of the invention;

FIG. 4 is a perspective view, partly in section, of some of the parts of the pump shown in FIG. 3;

FIG. 6 is a perspective view of the actuation mechanism for the plurality of pumps shown in FIG. 5.

Figure 1:
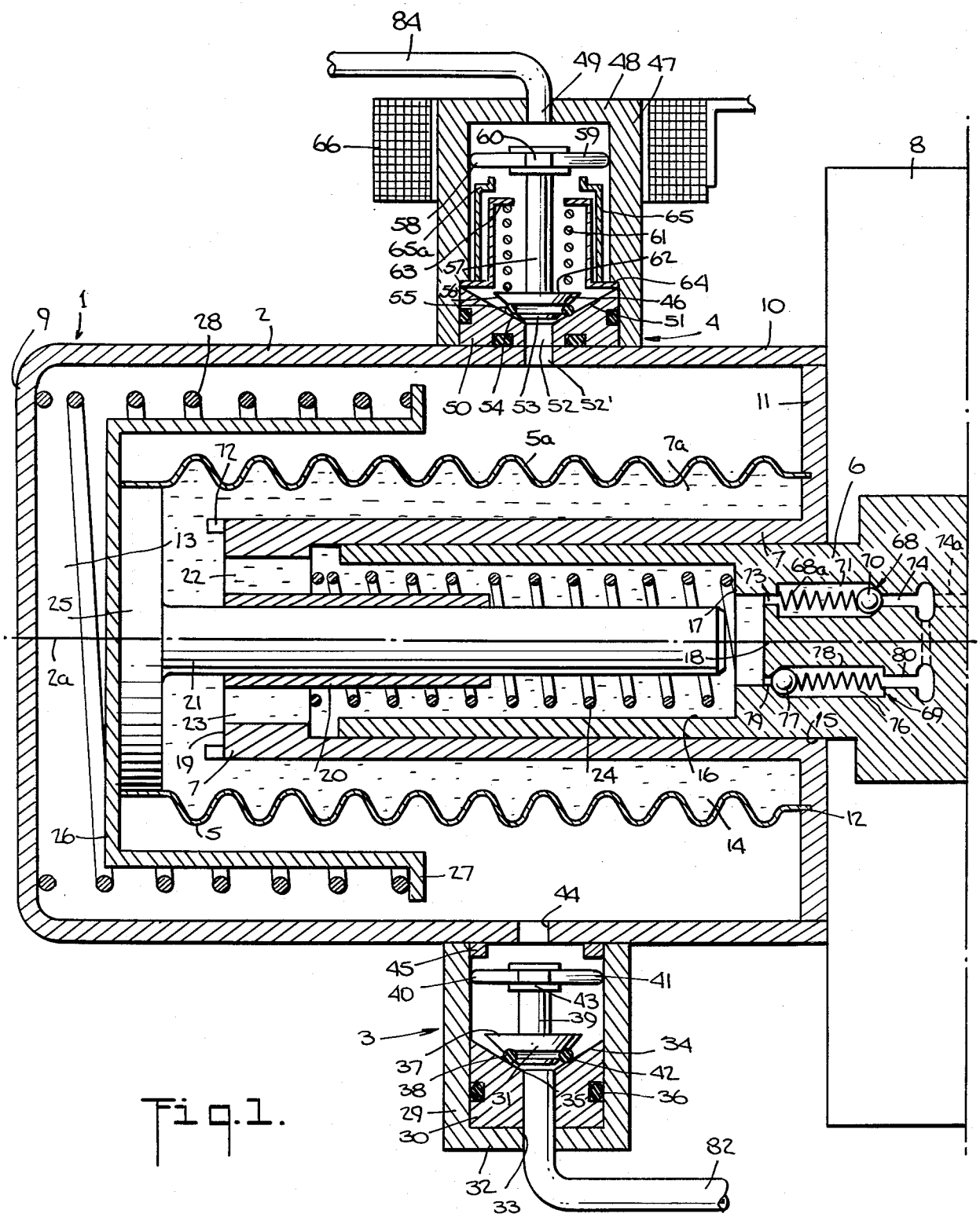
FIG. 1 is a side elevation, sectional view of the pump of the invention.

The pump 1 illustrated in FIG. 1 comprises a cylindrical envelope 2 having its longitudinal axis 2a extending horizontally, a suction valve 3, a delivery valve 4, both disposed with respect to the envelope 2 on an axis which is perpendicular to the longitudinal axis 2a of the envelope 2, a bellows 5 internally of the envelope, a piston 6 slidable in a fluid cylinder 7 internally of the bellows 5, an actuation mechanism (not illustrated in FIG. 1) for causing movement of the piston 6, an actuation fluid 7a which is inside the bellows 5 and able to deform the latter according to the movements of the piston 6, and a casing 8 containing in its inside the actuation mechanism which is also immersed in the actuation fluid 7a at atmospheric pressure.

Said envelope 2 is closed at one end by a circular wall 9, and at its other end 10, it has its circular edge tightly secured to the circular flange 11 of the fluid cylinder 7 in such a way as to prevent air infiltration between the inside and the outside of the envelope 2.

Said bellows 5 is arranged coaxially to the envelope 2, with its end 12 in contact with and sealed to the circular flange 11 of the fluid cylinder 7.

With the hereinbefore described arrangement of the pump parts, a chamber 13 is provided between the envelope 2 and the bellows 5, said chamber 13 being completely separated from the space 14 internally of the bellows 5. Said chamber 13 is entirely closed when the valves 3 and 4 are closed and communicates with the outside only when the valves 3 and 4 are operated, either to suck fluid into the chamber 13 or to deliver it under pressure outside the pump 1.

The space 14 contains an actuating fluid 7a which is subject to the action of the piston 6. Said piston 6 has an external cylindrical surface 15 able to slide in contact with the interior of the fluid cylinder 7 and, internally, has a tubular surface 16 substantially closed at one end by a base 18 of the piston.

The fluid cylinder 7 comprises, at the side opposite to the circular flange 11, a portion 19 of circular shape, provided with a central guide 20 to receive a stem 21 which forms part of the bellows 5. Holes 22 and 23 are arranged circularly all around said guide 20 to allow the passage of the actuating fluid 7a from between the inside of the tubular surface 16 of the piston 6 to the remaining part of the space 14. Between the central part 19 of the cylinder 7 and the base 18 of the piston, there is a helical spring 24 which functions to maintain the piston 6 in contact with the actuation mechanism (not illustrated in FIG. 1).

Said bellows 5 also comprises a circular plate 25 secured to the stem 21, which stem 21 extends as far as the inside of the tubular surface 16 of the piston 6 but does not extend far enough to engage the piston 6 during operation of the pump 1. A hood 26 with a circular flange 27 is secured to or engages the plate 25. The membrane 5a of the bellows 5 is secured to the plate 25. Between the wall 9 of the envelope 2 and the circular flange 27 of the hood 26, there is a helical spring 28 intended to compress the bellows 5 when the pump 1 works in the suction phase.

Said suction valve 3 comprises a first valve body comprising a cylinder 29 and an insert 30 and comprises a first operating element 31 to open and to close the valve 3. The cylinder 29 of the valve body has a base 32 with a central opening 33, and the insert 30 has an inner surface 34 of frusto-conical shape which converges toward a central hole 35.

In assembling the valve 3, said insert 30 is forced into the cylinder 29 until its end contacts the base 32. In said position, the hole 35 communicates with the central opening 33 of the cylinder 29 in such a way as to allow the passage of fluid between the exterior and the interior of the valve 3. Gaskets 36 ensure fluid tightness.

Said operating element 31 comprises a terminal portion 37, whose outer lateral surface has a shape corresponding to that of the frusto-conical seat of the insert 30, an annular gasket 38 made of a material which does not contaminate the oil 7a, for example, a fluoro-elastomer of the type known under the trade name "Viton", a cylindrical rod 39 and radial spokes, those visible in FIG. 1 being indicated with reference numerals 40 and 41.

In the assembled condition, the annular gasket 38 is associated with, and uniformly protrudes from, a recess 42 in the terminal portion 37, the rod 39 is connected to the center of the terminal portion 37, and the spokes 40 and 41 are situated around the end 43 of the rod 39 and contact the inner surface of the cylinder 29.

In the assembled position of the valve 3, the operating element 31 is disposed at the lower part of the envelope 2, and the space inside the cylinder 29 communicates with the chamber 13 of the pump 1 through a passage 44 provided in the envelope 2.

With respect to the materials used in the valve 3, preferably, the operating element 31 has its terminal portion 37 and the rod 39 made of aluminum, the spokes 40 and 41, etc. made of polytetrafluoroethylene, the annular gasket 38 of a fluoro-elastomer, the cylinder 29 of the valve body is made of stainless steel and the insert 30 is made of polytetrafluoroethylene.

The operating element 31, when made in the shape shown in FIG. 1, has such a weight that it can be lifted from the frusto-conical seat 34 of the insert 30 to open the valve 3 by the combined action of the pressure depression in the pump chamber 13 and of the difference between the level of the fluid oil supplied to the opening 33 and the level of the operating element 31, which difference is less than 40 cm., for example, a column of fluid oil of 30 cm.

During the pump suction phase, the stroke of the operating element 31 is limited by the presence of a stop ring 45 at the end of the cylinder 29 of the valve body which is engaged by the spokes 40 and 41, etc.

The delivery or output valve 4, like the suction or intake valve 3, comprises a second valve body and a second operating element 46. The second valve body is constituted by a cylinder 47 having a base 48 provided with a central opening 49, and by an insert 50 which is introduced, after introduction of the operating element 46, into the cylinder 47. Said insert 50 has an inner surface in the shape of a frusto-conical seat 51 terminating at a central hole 52.

Said second operating element 46 comprises a terminal portion 53, whose outer lateral surface 54 has a shape corresponding to that of the frusto-conical seat 51, an annular gasket 55, made of an elastomer possessing anti-contamination properties with respect to the fluid oil 7a, which is associated with, and uniformly protrudes from, a recess 56 in the terminal portion 53, a cylindrical rod 57 connected to the terminal portion 53 and radial spokes 58 and 59 arranged around the end 60 of the rod 57 and intended to contact the inner surface of the cylinder 47.

The operating element 46 is urged toward the seat 51 with a pre-established force by a spring 61 situated with its end between the surface 62 of the terminal portion 53 and an appropriate seat 63 secured to the inner wall of the cylinder 47 through a flange 64. The valve 4 is closed, when the pump is at rest, by means of the spring 61, and is opened when the fluid pressure in the chamber 13 overcomes the opposing force of said spring 61.

The valve body is secured to the upper part of the envelope 2 and communicates with the inside of the pump 1 through the central hole 52 of the insert 50 aligned with a passage 52' in the envelope 2 and with the outside of the pump 1 through the central opening 49.

The parts of the delivery valve 4 preferably are made of the same materials used for the suction valve 3. In particular, the cylinder 47 of the valve body is made of non-magnetic metal, such as non-magnetic stainless steel.

The pump 1 also comprises magnetic means associated with the delivery valve 4 to cause the opening of the latter when the pump 1 is not working. Said means comprises a first part, external to the valve, constituted by an electrically energizable coil 66 and a second part, internal to the valve 4, constituted by a sleeve 65 of a magnetic material, for example, soft iron. Said sleeve 65 is situated with one end engageable with the flange 64 and with its outer surface in sliding contact with the inner wall of the cylinder 47. As stated, the cylinder 47 is made of non-magnetic material in order not to magnetically screen the sleeve 65.

The pump 1 further comprises first and second devices 68 and 69 provided, respectively, to balance the flow of the actuation fluid between the inside of the cylinder 7 and the surface 15 of the piston 6 and to maintain the pressure of the actuation fluid 7a inside the bellows 5 within safe limits with respect to the pump structure.

Both of the devices 68 and 69 comprise, respectively, parts sensitive to the difference between the pressure of the actuation fluid 7a inside the bellows 5 and the pressure (atmospheric) of the actuation fluid 7a outside the pump 1, as well as parts sensitive to a limit value of the pressure inside the bellows 5. Said sensitive parts of the first device 68 comprise a first cylindrical spring 68a and a first ball 70 received in a first cavity 71 which is substantially of cylindrical shape. A stop element 72 is provided at the end of the cylinder 7 to prevent, for reasons which will be explained hereinafter, the complete compression of the bellows 5 during the suction phase of the pump 1. The stop element 72 is situated on the central part 19 of the cylinder and has an annular shape.

The first cavity 71 in the base of the piston 6 extends in a direction parallel to the axis 2a of the envelope 2. At its ends, it has a first hole 73 and a second hole 74 which respectively communicate with the part of the space 14 which is internal to the tubular surface 16 of the piston 6, and with a duct 74a which extends inside the casing 8 of the pump 1.

When the pump 1 is not working, the ball 70 is pushed by the spring 68a in such a way as to close completely the second hole 74.

Said second device 69 comprises a second spring 76 and a second ball 77, both encased in a second cylindrical cavity 78 in the base 18 of the piston 6 and extending in length in a direction parallel to the axis 2a of the envelope 2. Said second cavity 78 has, at its ends, a third hole 79 and a fourth hole 80, respectively communicating with the space 14 internally to the tubular surface 16 of the piston 6 and with the exterior of the pump 1, e.g., the duct 74a which is at atmospheric pressure.

When the pump 1 is not working and, further, when the pressure of the actuating fluid is below a pre-established limit value, the second ball 77 is pushed by the second spring 76 in such a way as to block completely the third hole 79.

The main advantage of the hereinbefore described pump is that of having the main parts, namely, the fluid cylinder 7 and the bellows 5, arranged the one around the other, as will be seen from an examination of FIG. 1. This permits considerable reduction of the length of the pump with a saving in the construction cost, and also with a greater possibility of installing it even in extremely small spaces. Moreover, the described first and second devices 68 and 69 co-operate in the required manner to improve bellows-type positive-displacement pumps. In fact, said devices 68 and 69, being completely inside the bellows 5 and being immersed in the actuation fluid 7a, have a much more immediate response. Moreover, said construction is advantageously compact and does not comprise delicate parts projecting from the pump envelope 2.

It is also evident that, since said devices 68 and 69 are situated inside the bellows 5, they do not involve problems of leakage towards the pump exterior. This feature permits the obtaining of a more efficient tightness under vacuum, which is extremely important, and further reduces the expense for the construction of the pump according to the invention.

Having described the pump of the invention, its operation will now be explained in connection with its use in a pumping plant (FIG. 2), which comprises a first tank 81 containing fluid oil which is under vacuum and which is suitable to be used in electric cables, a first connecting pipe 82 between the bottom 82' of the first tank and the suction valve 3, a second tank 83 for receiving and maintaining fluid oil under pressure, a second connecting pipe 84 between the delivery valve 4 and the second tank 83, a single-core electric cable with an oil duct 85, and a third pipe 86 between the sealing end 87 of the cable and the second tank 83.

The first tank 81 under vacuum (less than $10^{-2}$ torr) is situtated at such a height with respect to the pump 1 that, preferably, the distance between the minimum level H of fluid oil in the first tank 81 and the second operating element 46 is higher than 40 cm. to allow regular operation.

The second tank 83 is of any known type able to maintain fluid oil at a desired pressure and may, for example, be a tank of the type described in Italian Pat. No. 893,462 assigned to the assignee of this application. Said tank 83 is substantially constituted by a chamber 83b defined by an elastic member 83a which is intended to contain the degassified fluid oil at a pre-determined pressure and is urged toward the oil by gas at equal pressure as explained in said Italian patent. The chamber 83b of said tank 83 is connected to the duct 85 of a cable, so that any variation of the oil volume in the cable duct 85 is compensated for by the fluid oil of the chamber 83b.

In the described plant, the pump 1 has its own piston 6 associated with any actuation mechanism able cyclically to impart a thrust to the piston, for example, a crank and rod type alternating motion system, or, more simply, an eccentric C driven by a motor M, as is diagrammatically represented in FIG. 2.

The pumping plant has the task of taking fluid oil under vacuum from the tank 81 and of sending it, through the pump 1 and at the working pressure established for the cable, into the second tank 83, so as to provide fluid oil able to balance, through the pipe 86, any variation in the oil volume in the duct 85 of the cable.

The plant operates without air in the tanks 81 and 83, the pipes 82, 84 and 86 and in the pump interior. The air elimination is carried out in a step prior to the admission of fluid oil in the tank 81 and is effected by leaving the valve 3 closed, opening the valve 4 and providing appropriate vacuum pumps (not shown) connected at suitable points on the first and the second pipes 82 and 84.

The valve 4 is opened by displacing, by energizing the coil 66, the end 65a (FIG. 1) of the sleeve 65, so as to exert on the spokes 58, 59, etc. an upward thrust able to overcome the force of the spring 61. By the action of the coil 66, the operating element 46 is detached from the frusto-conical seat 51 and is maintained in said position until the vacuum pump inserted at a point on the pipe 84 (FIG. 2) has sucked the air from the inside of the chamber 13 (FIG. 1), the tank 83 and the tube 84 (FIG. 2).

In a subsequent step, a vacuum pump is applied at a point on the pipe 82 and the air contained in the first tank 81 and in the first pipe 82 is removed.

The operation of the pump 1 in the plant is as described hereinafter. The piston 6, subjected to the action of the eccentric C (FIG. 2), moves alternatively in one direction and in the opposite direction, sliding inside the fluid cylinder 7 (FIG. 1) and remaining with its base 18 always in contact with the eccentric C by the action of the spring 24.

During the movement of the piston 6 from the right to the left, as viewed in FIG. 1, the actuation fluid 7a contained inside the cylinder 7 is pushed by the piston 6 against the central plate 25 of the bellows 5, causing the expansion of the relative undulations 5a at the inside of the chamber 13 and compressing the counter-acting helical spring 28. Consequently, the fluid oil previously sucked from the tank 81, which tends to be reduced in the chamber 13 to a volume smaller than that it had in the final phase of the sucking step, is compressed and is pushed through the hole 52 against the operating element 46 of the delivery valve 4.

As soon as the pressure of the fluid oil is able to overcome the force of the spring 61 which opposes the opening of the delivery valve 4, the operating element 46 detaches from the seat of the insert 50 and the fluid oil, through the opening 49 and the pipe 84, is delivered at the desired pressure to the second tank 83.

During all this working step of the pump 1, the valve 3 (FIG. 1) remains closed, because the pressure of the fluid oil, which pushes the operating element 31 against the frusto-conical seat of the insert 30, causes the gasket 38 to press against the seat 34, so as to close hydraulically any communication between the first tank 81 (FIG. 2) and the inside of the chamber 13 (FIG. 1).

When the piston moves from the left to the right, as viewed in FIG. 1, the spring 28, previously compressed, gradually brings the bellows 5 to its original position, creating a pressure drop in the chamber 13. During this step, the valve 4 closes under the action of the spring 61 on the operating element 46 and the valve 3 opens, with the admission of fluid oil into the chamber 13, in consequence of the combined action of the pressure drop created by the movement of the bellows 5 and of the level of fluid oil in the first tank 81.

During said step, for a certain time interval, the actuation fluid is contained in a nearly constant space, since the volume generated by movement of the piston 6 corresponds to the volume reduction caused by movement of the bellows 5 through the action of the spring 28. However, at a certain moment, the central plate 25 of the bellows 5 abuts the stop element 72 of the cylinder 7 and is not further compressed while the piston 6 continues its movement towards its original position. Therefore, under said conditions, the space available for the actuation fluid becomes greater than is needed to contain it, so that a pressure drop takes place inside the bellows 5.

It follows that the first ball 70, being situated between the actuation fluid contained inside the casing 8 (FIG. 1) at atmospheric pressure, and the actuation fluid inside the bellows, at a lower pressure, is moved from its rest position for a pre-established appropriate setting of the first spring 68a, so that new fluid enters the inside of the bellows 5 through the holes 73 and 74 and the cavity 71.

Therefore, during each delivery phase, there is cyclically a compensation of the actuation fluid which, in the repeated and numerous strokes of the pump 1, is allowed to flow towards the casing 8, passing between the cylinder 7 and the surface 15 of the piston 6. This flowing of the oil, which is very reduced, has the aim of lubricating the metal walls of the cylinder 7 and of the piston 6, which are in mutual contact. In fact, to provide a greater resistance of the pump 1, the delicate, tightness members normally used as gaskets between the piston 6 and the cylinder 7 have been eliminated, so that in this case the tightness is of the metal-to-metal type.

As already stated, the pump comprises a second device 69 able to maintain the pressure of the actuation fluid within values consistent with the pump structure. The use of the second device might be necessary, for example, when, for any reason, the bellows 5 does not expand regularly, but remains blocked at an intermediate position of its normal expansion. It can be understood that in such case, owing to the continuous movement of the piston 6 and the blocking of the bellows 5, and consequently of its central plate 25, pressure values of the fluid could be reached, which would be too high for the pump structure.

To avoid such possible failure, the second spring 76 of the second device 69 is so rated that it can be overcome by the pressure of the fluid inside the bellows 5 only when a certain safety limit is exceeded. When said limit value is reached, the fluid displaces the second ball 77 and outflows, through the holes 79 and 80, towards the pump exterior, preventing any rupture of the pump 1 and permitting action to re-establish a correct operation.

A further embodiment of the pump of the invention is shown in FIGS. 3 and 4 and may be used in the above described plant. Said further embodiment is substantially the same as the pump as already described, but has a different arrangement of its inner parts. In the description given hereinafter, parts which correspond to parts previously described will be identified by the same reference numerals.

In the preferred embodiment shown in FIGS. 3 and 4, the fluid cylinder 7b comprises, at its end opposite to its circular flange 11, four protuberances 88 extending in the direction of the axis 7c of the cylinder 7b, with such intervals between the protuberances 88 as to provide cavities 89 between the inner space and the outer space defined by the lateral surface of the fluid cylinder 7b. The fluid cylinder 7b comprises a circular flange 90 (FIG. 3), intended to receive one end of the spring 24.

The pump 1b further comprises the spring 28 (FIGS. 3 and 4), having the same function as explained hereinbefore, and a cylindrical case 91, having an inner diameter substantially equal to the outer diameter of the fluid cylinder 7b.

Said case 91 comprises at one end a second circular flange 92 extending outwardly and, at the opposite end, radial prolongations 93 (FIG. 4) convergent towards a center threaded hole 94. Said radial prolongations 93 are so made that an empty space 95 (FIG. 4) is left between them, such space 95 having an area greater than the maximum cross-section of the protuberances 88 in order to allow the passage of the latter and the passage of the actuation fluid.

The case 91 is placed over the cylinder 7b with the protuberances 88 inside the cavities 89 and is connected to the central plate 25a of the bellows 5b by means of a bolt 97 screwed in the threaded hole 94 (FIG. 3). The head of said bolt 97 is surrounded by a casing 99 having a base 100 which is tightly sealed to the circular plate 25a of the bellows 5b.

The helical spring 28 is disposed around the outer surface of the cylindrical case 91 and is compressed between the second circular flange 92 and a further appropriate third flange 101 connected by screws 102 (FIG. 4) to the protuberances 88.

The principles of operation of the pump shown in FIGS. 3 and 4 do not differ from those previously explained in connection with the pump 1 used in the plant of FIG. 2. Therefore, for simplicity's sake, a detailed description will not be given.

The main advantage of the preferred embodiment of the pump 1b shown in FIGS. 3 and 4 lies in the position of the spring 28 inside the bellows 5b. In fact, for the various kinds and sizes of bellows-type pumps which can be used, it is not always possible to ensure a space between the bellows and the envelope which is sufficiently large to contain a helical spring without the potential risk that the turns of the spring may rub against the inner walls of the envelope and consequently, may produce mechanical impurities prejudicial to the electrical properties of the fluid oil. Accordingly, the arrangement of the spring 28 inside the bellows 5b, rather than outside it, eliminates said potential risk and further aids in preventing contamination of the fluid oil sucked by the pump and delivered to the electric cable.

A further advantage of the pump 1b illustrated in FIGS. 3 and 4 resides in the evident simplicity and assembling ease of the various parts.

The description to this point has been with reference to the pump of the invention applied as a single pumping unit to the plant of FIG. 2. Hereinafter, a further plant comprising six pumps 1 or 1b (FIG. 5), each substantially as illustrated in FIG. 1 or in FIGS. 3 and 4, will be described.

Figure 5:
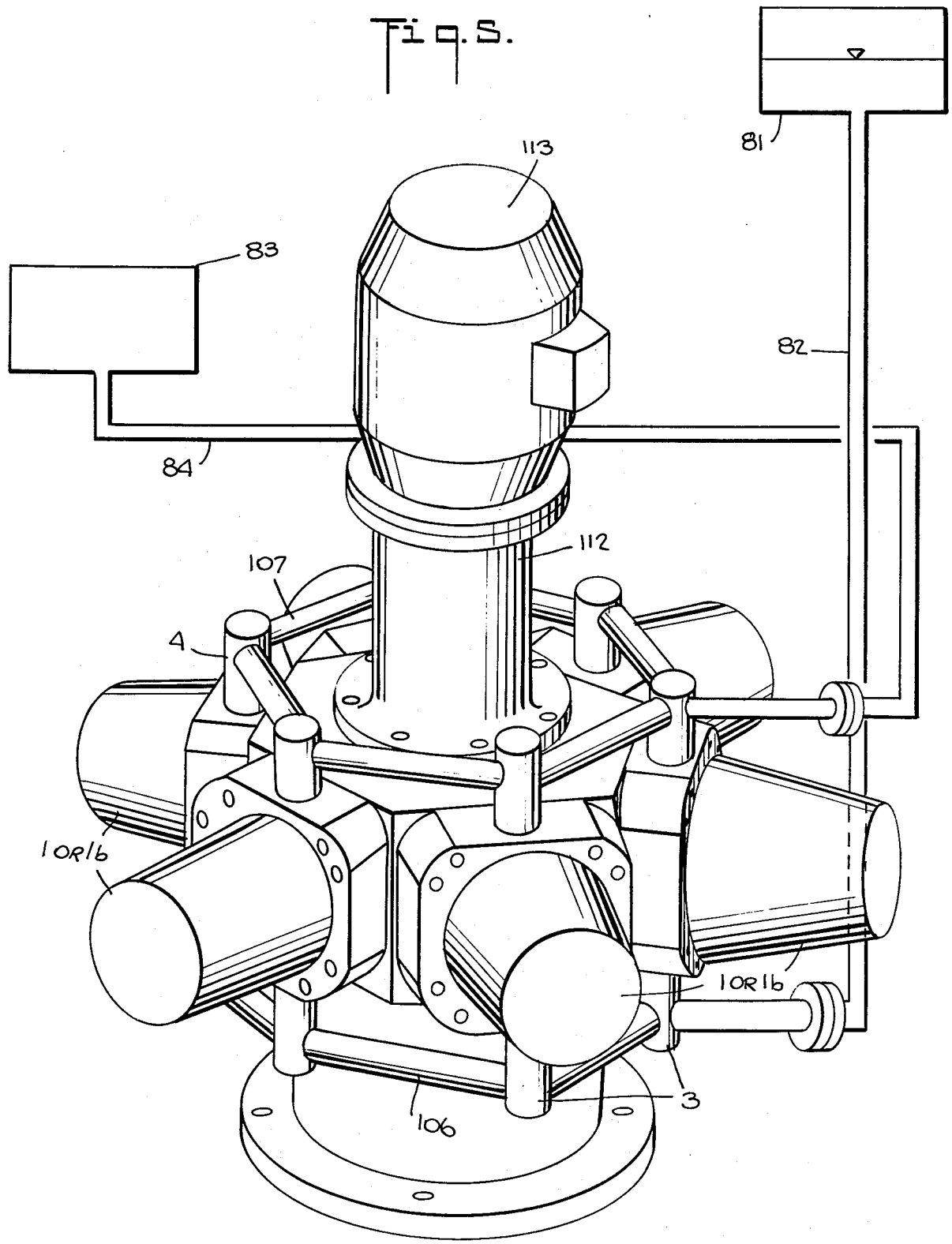
FIG. 5 is a partly schematic, perspective view of a pumping plant with a plurality of pumps.

Said pumps 1 or 1b have their horizontal axes extending radially in a same plane, each pump comprising a suction valve 3 and a delivery valve 4, with their axes aligned and perpendicular to the plane defining the axes of the six pumps. Said plant, moreover, comprises a first and a second manifold 106 and 107, for connecting, respectively, the suction valves 3 to one another and the delivery valves 4 to one another, a first and a second tank 81 and 83, having the same function and position as those illustrated in FIG. 2, a first and a second pipe 82 and 84 for connecting, respectively, the first tank 81 to the first manifold 106 and the second tank 83 to the second manifold 107, and a single actuation mechanism 112 for all six pumps (FIGS. 5 and 6).

Said actuation mechanism comprises a motor 113 (FIG. 5) for the actuation of a shaft 114 (FIG. 6) arranged perpendicularly to the horizontal plane which defines the axes of the pumps, an eccentric 115 (FIG. 6) driven by the shaft 114, a prismatic element 116 with six faces 117, six groups 118 of roller bearings situated with their axes parallel to the axis of the shaft 114 and associated with the faces 117 of the element 116, as shown in FIG. 6.

Said prismatic element 116 (FIG. 6) contains inside thereof the eccentric 115 and further roller bearings 118a. The element 116 is disposed between the six pumps in such a way as to be held in a non-rotating position in the space between the pumps because of the thrust which each piston 6, through the springs 24, exerts on the faces 117.

With respect to the plant of FIG. 5, it is pointed out that it does not substantially differ from the previously described one, with the exception of the actuating mechanism and of the use of six pumps, the operation of which will be described hereinafter, starting from the moment in which the motor 113 places into rotation the shaft 114 and, with it, the eccentric 115 (FIG. 6).

In said conditions, each face 117 of the prismatic element 116 is subjected to two thrusts, one from the outside towards the inside of the element 116, due to the action which each spring 24 exerts on the associated piston 6, and the other, which is cyclic and temporary, from the inside towards the outside of the element 116 during the contact with the eccentric 115 in rotation. It follows that the prismatic element 116, subjected to the thrust imparted by the eccentric 115, which is greater than that of the spring 24, is subjected on each face 117 to a first force component in the direction of the pump axis, and to a second component which is horizontal and perpendicular to the first.

The first force component exerts, in its turn, a thrust on the piston 6, overcoming the counteracting force of the spring 24 and causing the already explained compression phase of the pump. The second force component is inactive to the effect of the pump compression, and determines only the rolling of the bearings 118, which advantageously eliminate a sliding friction between the base 18 of the piston 6 and the face 117 of the prismatic element 116.

As soon as the eccentric 115 drives the relevant face 117 of the prismatic element 116 in a direction towards the axis of the shaft 114, the associated pump carries out the suction phase, during which the bellows 5 or 5b returns to the rest position owing to the elasticity force accumulated by the spring 28 (FIG. 1) of the pump in the preceding compression phase.

During the compression and suction phase of the pump, the piston 6 is kept in constant contact with the relevant face 117 of the prismatic element 116 by the presence of the spring 24.

The plant shown in FIG. 5 is particularly suitable to be used when it is wished to avoid a discontinuous flow rate as would be obtained with one pump only and when it is desired to obtain a desired flow rate. A further advantage of said plant lies in the longer life of the bellows 5 or 5b which is the part more usually subject to rupture.

In fact, it is known that the longer the extensions of the bellows, the shorter is its life. Therefore, without changing the desired capacity of a pump plant, the bellows' extension may be reduced by increasing the number of the pumps, without, however, substantially increasing the overall size of the plant. Said result is obtained by the described radial arrangement of the pumps, which permits the use of a single mechanism, centrally disposed, for actuating all the pumps.

To complete the description of the present invention, it is here pointed out that some of the improvements described for the positive-displacement pump with actuation fluid for the bellows can be applied also to positive-displacement pumps in which the central plate 25 of the bellows is directly connected to the piston 6, namely, is mechanically moved without the employment of the actuation fluid. Said latter pumps could find employment in pumping plants in which the fluid oil must have a pressure lower than 15 kg/cm$^2$. In such plants, it has been noted that, even if the thicknesses of the bellows walls are within normal limits, the pressure difference which could take place between the 15 kg/cm$^2$ pressure of the fluid oil in the pump chamber and the atmospheric pressure inside the bellows would not be such as to stress the bellows walls in an undesired manner.

Although preferred embodiments of the present invention have been illustrated and described, it will be apparent to those skilled in the art that various modifications may be made without departing from the principles of the invention.

What is claimed is:

1. In an oil pumping system comprising a first tank and a second tank, a pump for drawing oil from said first tank and for delivering said oil under pressure to a second tank, said pump having an intake valve and a delivery valve and said delivery valve being both operable from externally thereof and by said oil, a first oil line connecting said first tank to said intake valve, a second oil line connecting said second tank to said delivery valve, the method of starting-up said system which comprises;
   opening said delivery valve from externally thereof;
   exhausting air from said first and second oil lines, said pump, and said first and second tanks by withdrawing air at a point on said second oil line;
   closing said delivery valve;
   supplying air-free oil to said first tank; and
   actuating said pump to transfer said oil from said first tank to said second tank.

2. A method as set forth in claim 1, wherein said delivery valve is openable by the application of a magnetic field thereto from externally of said delivery valve and wherein the step of opening said delivery valve comprises the application of a magnetic field thereto.

3. A pump for sucking oil under vacuum in a source thereof and supplying such oil to an electric cable under a pressure above atmospheric pressure, said pump comprising:
   an envelope;
   a tubular bellows within said envelope and sealed at an end thereof to said envelope, said bellows being disposed within said envelope so that the outer surface thereof forms an oil receiving chamber with the inner wall of said envelope;
   spring means acting between said bellows and said envelope and urging said bellows to contract;
   a reciprocable piston in said envelope and outside said chamber, said piston being in and coaxial with said bellows and being spaced from said bellows to provide a fluid receiving space between said bellows and said piston;
   a fluid in said fluid receiving space connecting said piston with said bellows for causing reciprocation of a portion of said bellows with reciprocation of said piston;
   a hollow cylinder around said piston in sliding engagement therewith and intermediate said piston and said bellows, said cylinder being sealed to said envelope;
   an intake valve communicating with the interior of said chamber and with the exterior of said chamber for admitting oil into said chamber from said source of oil, said valve having an operating element for opening and closing said valve, said element having an open position and a closed position and in the absence of oil in said chamber being held in its closed position solely by reason of its weight but being movable to its open position with a reduction in pressure in said chamber and the static pressure of the oil from said source; and
   a delivery valve communicating with the interior of said chamber and with the exterior of said chamber for delivering oil from said chamber to said cable, said delivery valve having an operating element for opening and closing the latter valve, said last-mentioned element having an open position and a closed position and said delivery valve having resilient means urging said last-mentioned element into said closed position but said last-mentioned element being movable to its open position by oil in said chamber under a pressure sufficient to overcome the force of said resilient means.

4. A pump as set forth in claim 3, wherein said end of said case connected to said bellows has a plurality of extensions directed toward the axis of said case and a plurality of openings between said extensions and said cylinder has a plurality of protuberances thereon extending through said openings in spaced relation to at least portions of the walls of said openings.

5. A pump for sucking oil under vacuum in a source thereof and supplying such oil to an electric cable under a pressure above atmospheric pressure, said pump comprising:
   an envelope;
   a tubular bellows within said envelope and sealed at an end thereof to said envelope, said bellows being disposed within said envelope so that the outer surface thereof forms an oil receiving chamber with the inner wall of said envelope;
   a reciprocable piston in said envelope and outside said chamber, said piston being in and spaced from said bellows to provide a fluid receiving space between said bellows and said piston;
   a fluid in said fluid receiving space connecting said piston with said bellows for causing reciprocation of a portion of said bellows with reciprocation of said piston;
   fluid supply means at atmospheric pressure connected to said fluid receiving space for supplying said fluid thereto;
   an intake valve communicating with the interior of said chamber and with the exterior of said chamber for admitting oil into said chamber from said source of oil, said valve having an operating element for opening and closing said valve, said element having an open position and a closed position and in the absence of oil in said chamber being held in its closed position solely by reason of its weight but being movable to its open position with a reduction in pressure in said chamber and the static pressure of the oil from said source, said operating element of said intake valve being made of material having a specific gravity less than 2.5 grams per cubic centimeter, said intake valve having a frusto-conical valve seat and the operating element of said intake valve having a frusto-conical terminal portion and an annular elastomeric gasket on said portion engageable with said seat; and a delivery valve communicating with the interior of said chamber and with the exterior of said chamber for delivering oil from said chamber to said cable, said delivery valve having an operating element for opening and closing the latter valve, said last-mentioned element having an open position and a closed position and said delivery valve having resilient means urging said last-mentioned element into said closed position but said last-mentioned element being movable to its open position by oil in said chamber under a pressure sufficient to overcome the force of said resilient means, said delivery valve having a frusto-conical valve seat and the operating element of said delivery valve having a frusto-conical terminal portion and an annular elastomeric gasket on said portion engageable with said last-mentioned seat.

6. A pump as set forth in claim 5, wherein said operating element of said intake valve comprises a stem extending from said terminal portion and secured to the latter and a plurality of spokes extending outwardly from and secured to said stem and spaced from said terminal portion for guiding said last-mentioned operating element and wherein said terminal portion and said stem are made of an aluminum alloy and said spokes are made of polytetrafluoroethylene.

7. A pump as set forth in claim 6, wherein each of said intake valve and said delivery valve comprises a valve body having a cylindrical inner surface, said body being secured to said envelope, said operating element of said delivery valve comprises a stem secured to and extending from said terminal portion thereof and a plurality of spokes secured to and extending outwardly from said stem, and each said operating element is within the corresponding body with the spokes thereof in sliding engagement with said inner surface of the corresponding body for guiding the operating element.

8. A pump as set forth in claim 7, wherein said operating element of said delivery valve is entirely within said body and has magnetic material associated therewith and further comprising control means external to said body for moving said last-mentioned operating element from its closed position to its open position, said control means comprising means for producing a magnetic field extending within said body for moving said last-mentioned operating element.

9. A pump as set forth in claim 8, wherein said magnetic material associated with said operating element of said delivery valve comprises a sleeve of magnetic material around said last-mentioned operating element, said sleeve being displaceable with respect to and engageable with said last-mentioned operating element whereby the latter is normally free to move with respect to said sleeve but is movable by said sleeve when the latter is moved by said control means, and wherein said body is made of non-magnetic material.

10. A pump as set forth in claim 5, wherein said fluid supply means comprises a reservoir of said fluid at atmospheric pressure, duct means connecting said reservoir to said space between said piston and said bellows and valve means in said duct means for permitting flow of fluid from said reservoir to said space but preventing reverse flow.

11. A pump as set forth in claim 10 further comprising further valve means communicating with said space and permitting flow of fluid out of said space when the pressure of said fluid exceeds a predetermined value.

12. A pump as set forth in claim 5 further comprising a hollow cylinder around said piston in sliding engagement therewith and intermediate said piston and said bellows, said cylinder being sealed to said envelope in stationary relation thereto, and spring means acting between said bellows and said envelope and urging said bellows to contract.

13. A pump as set forth in claim 5 further comprising a hollow cylinder around said piston and in sliding engagement therewith, said cylinder being sealed to said envelope in stationary relation thereto and said cylinder having an inside dimension which is larger than the outside dimension of said piston to provide a clearance space between said cylinder and said piston, said clearance space being at least partially unobstructed to permit said fluid to flow between and axially of said cylinder and said piston.

14. In combination with the pump of claim 5, a first tank containing said oil under vacuum, means connecting said tank to said intake valve for the supply of said oil from said tank to said chamber, a second tank for receiving said oil under pressure, means connecting said second tank to said delivery valve for the supply of said oil from said chamber to said second tank, an electrical cable having an oil duct and means connecting said second tank to said duct of said electrical cable for the supply of said oil to said cable, said first tank containing said oil at a level above the level of said intake valve for applying pressure to said operating element of said intake valve for urging said last-mentioned element toward its open position.

15. The combination as set forth in claim 14, wherein said pump is mounted in a position such that said operating element of said intake valve is urged toward its closed position by gravity.

16. The combination as set forth in claim 15 further comprising a plurality of said pumps disposed around a common point with the pistons thereof reciprocable in a common, substantially horizontal plane and toward and away from said common point, means interconnecting the intake valves of said pumps together for the flow of said oil therebetween and means interconnecting the delivery valves of said pumps together for the flow of said oil therebetween.

17. The combination as set forth in claim 16 further comprising actuating means at said common point and mechanically connected to the pistons of all said pumps for reciprocating said pistons.

18. The combination as set forth in claim 17, wherein said actuating means comprises a motor, an eccentric drivingly connected to said motor, a driving element around said eccentric, said driving element having a plurality of external faces equal in number to the number of said pumps and extending perpendicularly to said plane, said driving element being movable by said eccentric in said plane, and means interconnecting the pistons of said pumps and said faces to cause reciprocation of said pistons with movement of said driving element in said plane.

19. The combination as set forth in claim 18, wherein said means interconnecting said pumps and said faces comprises roller bearings engaging said faces and spring means urging said portions of said pistons against said roller bearings.

* * * * *